(12) United States Patent
Doerr

(10) Patent No.: US 8,787,708 B2
(45) Date of Patent: Jul. 22, 2014

(54) ENDLESS PHASE SHIFTING

(75) Inventor: Christopher Doerr, Middletown, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 206 days.

(21) Appl. No.: 13/210,299

(22) Filed: Aug. 15, 2011

(65) Prior Publication Data
US 2013/0044974 A1    Feb. 21, 2013

(51) Int. Cl.
| | |
|---|---|
| *G02F 1/035* | (2006.01) |
| *G02F 1/295* | (2006.01) |
| *G02F 1/225* | (2006.01) |
| *G02F 1/313* | (2006.01) |
| *G02F 1/21* | (2006.01) |
| *G02B 6/12* | (2006.01) |

(52) U.S. Cl.
CPC .............. *G02F 1/225* (2013.01); *G02F 1/3136* (2013.01); *G02F 2001/212* (2013.01); *G02B 2006/12142* (2013.01)
USPC ......... 385/3; 385/8; 385/14; 385/39; 385/129

(58) Field of Classification Search
CPC . G02F 2001/212; G02F 1/225; G02F 1/0147; G02F 1/3136; G02F 2203/50; G02B 2006/12142
USPC ................ 385/3, 8, 9, 14–17, 27, 30, 39, 129
See application file for complete search history.

(56) References Cited

U.S. PATENT DOCUMENTS

| | | | |
|---|---|---|---|
| 4,966,431 A | | 10/1990 | Heismann |
| 6,147,755 A | * | 11/2000 | Heflinger et al. ............. 356/491 |
| 2005/0058459 A1 | * | 3/2005 | Chandrasekhar et al. .... 398/161 |

OTHER PUBLICATIONS

International Search Report and Written Opinion of the International Searching Authority.
Cappuzzo M et al: "Potentially Inexpensive 10-Gb/s Tunable Dispersion Compensator with Low Polarization Sensitivity", IEEE Photonics Technology Letters, IEEE Service Center, Piscataway, NJ, US, vol. 16., No. 5, May 1, 2004, pp. 1340-1342, XP011111596, ISSN: 1041-1135, DOI: 10.1109/LPT.2004.826140, p. 1340; Figure 1.
Madsen C K: "Planar Waveguide Optical Filters and Polarization Transformers for Compensating Dispersive Effects", Fibres and Optical Passive Components, 2005. Proceedings of 2005 IEEE / LEOS Workshop on Mondello, Italy Jun. 22-24, 2005, Piscataway, NJ, USA, IEEE, Jun. 22, 2005, pp. 135-14.
Buhl L et al: "Versatile Integrated PMD Emulation and Compensation Elements", Journal of Lightwave Technology, IEEE Service Center, New York, NY, US, vol. 22, No. 4, Apr. 1, 2004, pp. 1041-1050, abstract, figure 1d.
Cappuzzo M et al: "Reset Free Integrated Polarization Controller Using Phase Shifters", IEEE Journal of Selected Topics in Quantum Electronics, IEEE Service Center, Piscataway, NJ, US, vol. 11, No. 2, Mar. 1, 2005, pp. 431-438, abstract; figure 2c.

* cited by examiner

*Primary Examiner* — Kaveh Kianni
*Assistant Examiner* — Hung Lam
(74) *Attorney, Agent, or Firm* — Brosemer, Kolefas & Associates

(57) ABSTRACT

Endless phase shifting apparatus, structures, and methods useful—for example—in MIMO optical demultiplexing.

10 Claims, 9 Drawing Sheets

Exemplary PDM Demultiplexer

US 8,787,708 B2

ENDLESS PHASE SHIFTING

TECHNICAL FIELD

This disclosure relates to endless phase shifting systems, structures, devices and methods useful—for example—in multiple-input-multiple output (MIMO) optical demultiplexers.

BACKGROUND

Optical mode-division multiplexing (MDM)—for example polarization-division multiplexing (PDM) or spatial MDM—are techniques typically known to increase the capacity and/or efficiency of optical transmission via optical fiber. Systems employing these techniques may use electronic digital signal processors (DSPs) to perform demultiplexing.

SUMMARY

An advance is made in the art according to an aspect of the present disclosure directed to systems, structures, devices and methods for endless phase shifting of optical signals useful—for example—in MIMO optical demultiplexing.

According to a first exemplary embodiment, the present disclosure is directed to an optical apparatus providing endless phase shifting of optical signals. Advantageously, an optical apparatus according to the present disclosure may monotonically increase (or decrease) the optical phase by more than 1000 radians—particularly when controlled via a set of control signals.

According to another aspect, the present disclosure is directed to an optical apparatus comprising a first Mach-Zehnder interferometer (MZI) switch including a phase shifter, a second MZI switch including a phase shifter, and a line phase shifter structure optically connecting the first MZI to the second MZI, said line phase shifter structure including a phase shifter and a parallel passive waveguide wherein the overall phase characteristic of the apparatus is determined by the line phase shifter.

According to another exemplary embodiment, the present disclosure is directed to an optical demultiplexer comprising N power splitters and N endless-phase-shifter-endless-switch structures (EPS-ESS) optically connected to each of the N phase shifters such that when an optical signal exhibiting N modes is simultaneously applied to the N power splitters, N output signals each exhibiting a different one of the N modes is output.

BRIEF DESCRIPTION OF THE DRAWING

A more complete understanding of the present disclosure may be realized by reference to the accompanying drawings in which.

The illustrative embodiments are described more fully by the Figures and detailed description. The inventions may, however, be embodied in various forms and are not limited to embodiments described in the Figures and detailed description

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure. Accordingly, those skilled in the art will readily appreciate the applicability of the present disclosure to a variety of applications.

It is noted that MIMO demultiplexing is "endless"—meaning that MIMO demultiplexers must track changes in mode coupling without requiring resets that interrupt the received signal. While such endless operation is relatively straightforward in contemporary systems employing an electronic Digital Signal Processor (DSP), endless operation of a MIMO optical demultiplexer is not.

Figure 1:
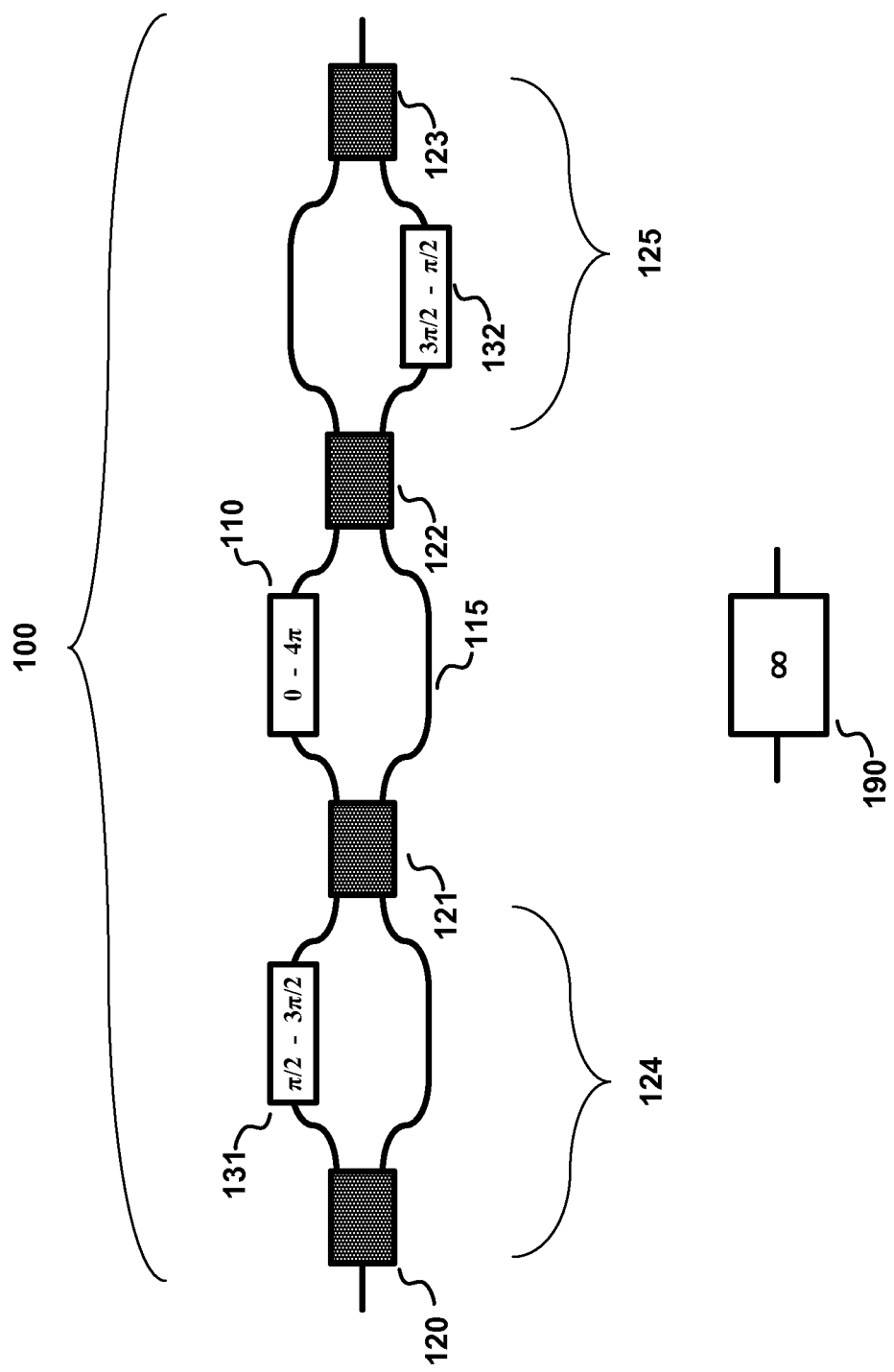
FIG. 1 depicts a schematic of an endless phase shifter according to an aspect of the present disclosure.
Figure 2:
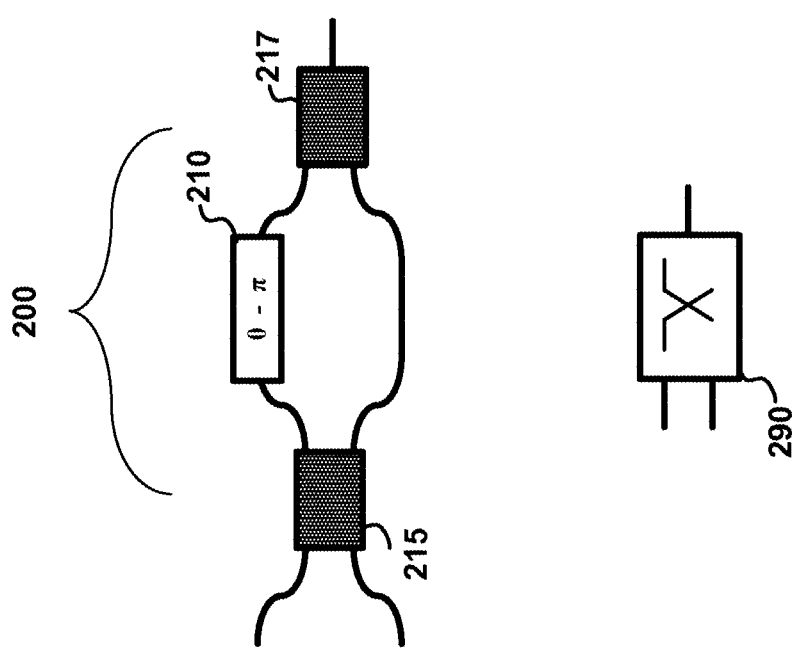
FIG. 2 depicts a schematic of an endless switch according to an aspect of the present disclosure.

Two elements of MIMO optical demultiplexing according to an aspect of the present disclosure are an endless phase shifter and an endless switch shown schematically in FIG. 1 and FIG. 2, respectively. With reference to FIG. 1, it may be observed that an endless phase shifter 100 includes a "line" phase shifter 110 exhibiting a range of 0 to $4\pi$ and a parallel passive waveguide 115 both of which are connected to a 1×2 Mach-Zehnder interferometer (MZI) switch 124 and to a 2×1 MZI switch 125 via 2×2 couplers 121, 122. In a particular embodiment, the passive waveguide 115 will exhibit the same effective length as the line phase shifter 110 when it (the line phase shifter) is at $2\pi$ phase. Differences in length of the two waveguides comprising the line phase shifter 110 will be less than approximately 10 microns.

Optical input and output to the endless phase shifter 100 is via couplers 120, 123, which may be either 1×2 or 2×2 devices. Shown further in FIG. 1 are phase shifters 131 and 132 which are part of MZI switches 124 and 125, respectively. The phase shifter 131 which is part of MZI switch 124 exhibits a range of substantially $\pi/2$ to $3\pi/2$ while the phase shifter 132 which is part of MZI switch 125 exhibits a range of substantially $3\pi/2$ and $\pi/2$—as depicted in FIG. 1. Advantageously, the structures comprising the endless phase shifter 100 may be conveniently fabricated using contemporary, silicon integrated waveguide fabrication techniques and materials.

As shown in FIG. 1, the numbers associated with each of the phase shifters 131, 110, and 132 are indicative of their range(s). Notably, and for our discussion purposes only, it is assumed that these phase shifters provide only one sign of phase shift.

Operationally, the line phase shifter 110 controls the overall phase of the endless phase shifter 100 and in a representative embodiment initially exhibits a nominal value of $2\pi$. When the line phase shifter 110 exhibits a value of substantially 0 or $4\pi$, the two MZI phase shifters 131, 132 simultaneously switch from $\pi/2$ and $3\pi/2$ to $3\pi/2$ and $\pi/2$, respectively. Because the MZI arm phase difference(s) is an integer multiple of $2\pi$, this switching preserves the overall phase of the endless phase shifter even though it switches the path of light from the line phase shifter 110 to the passive waveguide 115.

As may be appreciated by those skilled in the art, the two MZI switches 124, 125 preferably switch substantially simultaneously (within 30 degrees of each other). If the phase shifters 131, 132 which are part of the switches 124, 125 respectively, are mis-synchronized by only 10°, the overall magnitude and phase will change by only 0.03 dB and 5°, respectively.

Once switched, the line phase shifter 110 rapidly switches to $2\pi$, i.e., substantially the center of its operating range. Next, again simultaneously, the MZI phase shifters 131, 132 switch back to $\pi/2$ and $3\pi/2$ respectively, and the line phase shifter 110 resumes controlling the overall phase produced through the effect of the overall endless phase shifter 100.

The passive waveguide 115 may also contain a phase shifter. This phase shifter can be activated to continue control while the MZI switches are switching so that the phase change does not have to be paused during switching. Also, this phase shifter could become the line phase shifter.

As may be appreciated, the endless phase shifter such as that shown and described may advantageously shift the phase indefinitely, for example by an amount of more than 1000 radians. Likewise, the endless phase shifter may decrease the phase indefinitely, again by an amount more than 1000 radians.

This endless phase shifter may be used in other applications besides MIMO demultiplexing. For example, it may be used to endlessly track phase in a coherent receiver. Another example is it may be used to provide a continuous frequency shift to a signal.

For purposes herein, the overall endless phase shifter 100 structure is abbreviated to that depicted by abbreviated structure 190.

Turning now to FIG. 2, there is shown an endless switch 200 according to an aspect of the present disclosure. As shown therein, an endless switch 200 comprises a Mach-Zehnder Interferometer having a phase shifter 210 in one arm.

In a preferred embodiment, the phase shifter 210 imparts a phase shift having a magnitude between 0 and $\pi$. Input(s) and output(s) to the switch 200 are provided via 2×2 and 2×1 couplers 215, 217 respectively. While not specifically shown in the FIG. 2, but as will be readily appreciated by those skilled in the art, endless switch 200 does not require any reset operation. This is because it controls magnitude, and, unlike phase, magnitude cannot change to arbitrarily large values nor be less than zero. For purposes herein, the overall endless switch 200 structure is abbreviated to that depicted by abbreviated structure 290.

As may now be appreciated by those skilled in the art, a N×1 endless switch may be constructed from a tree network of endless 2×1 switches such as that shown in FIG. 2. Such a N×1 endless switch is shown schematically in FIG. 3.

Figure 4:
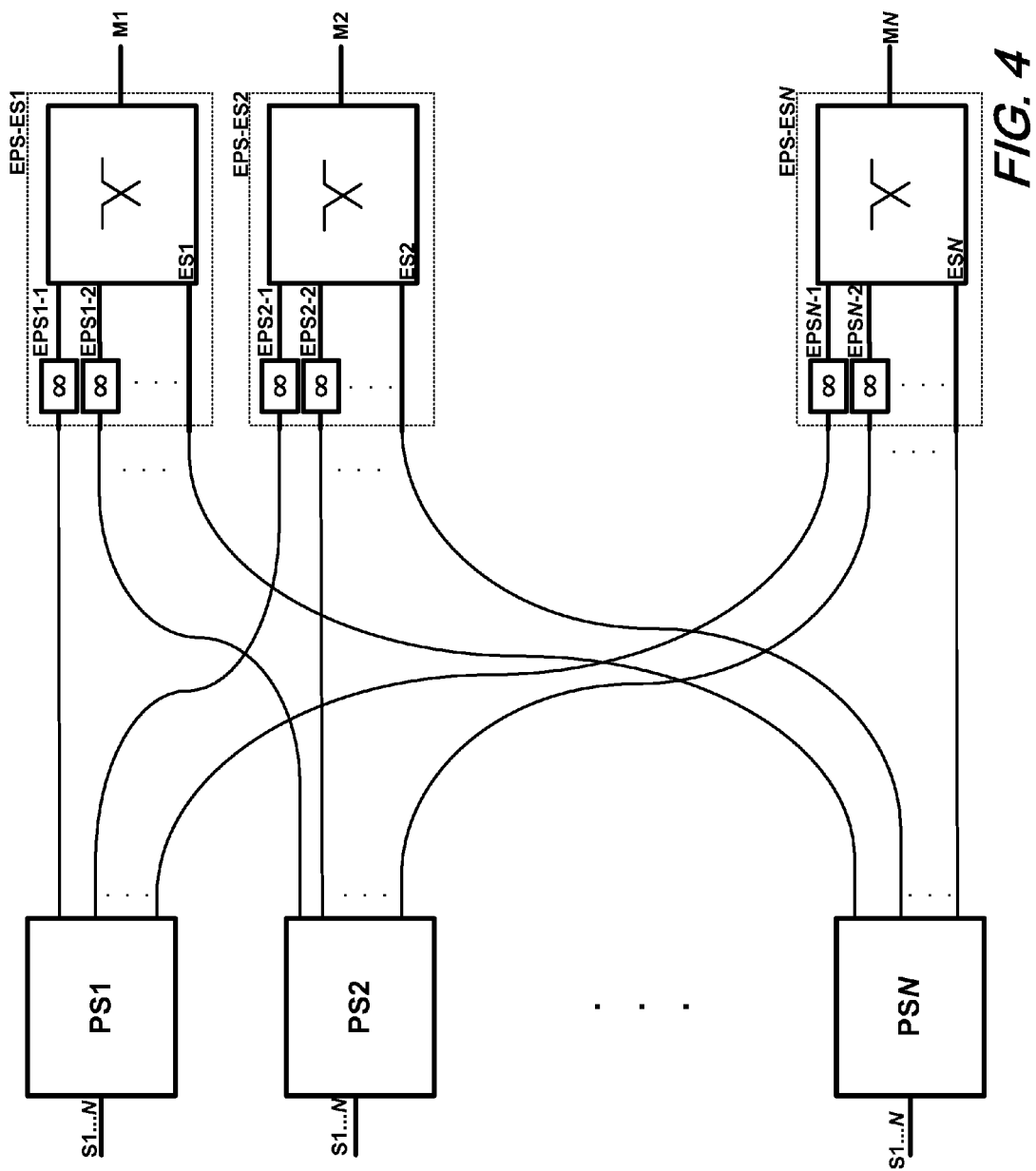
FIG. 4 depicts a schematic of a MIMO optical demultiplexer according to an aspect of the present disclosure.

With reference to FIG. 4, there is depicted a schematic architecture of a MIMO optical demultiplexer 400 according to an aspect of the present disclosure. Advantageously, it may generally exhibit a type of "broadcast-and-select" architecture such as that shown. This architecture may be used in either the left-to-right direction or right-to-left direction. Both directions can perform MIMO optical demultiplexing.

Operationally, optical signals exhibiting N modes $S_1 \ldots _N$ are received by the demultiplexer from which signals exhibiting only the individual modes $M_1, M_2, \ldots M_N$ are output. Advantageously, a demultiplexer such as that shown according to an aspect of the present disclosure will successfully demultiplex the optical signals received whether fiber mode coupling is unitary or not by "nulling-out" all modes but one at each of the individual outputs.

Upon receipt, the signals are split through the effect of N power splitters $PS_1 \ldots PS_N$. The power splitters maintain the optical power of the demultiplexed modes substantially constant—regardless of mixing state. The N outputs from the power splitters $PS_1 \ldots PS_N$ are optically conveyed to N endless-phase-shifter-endless-switch-structures (EPS-$ES_1 \ldots$ EPS-$ES_N$) from which the individual N modes $M_1 \ldots M_N$ are respectively output.

Figure 3:
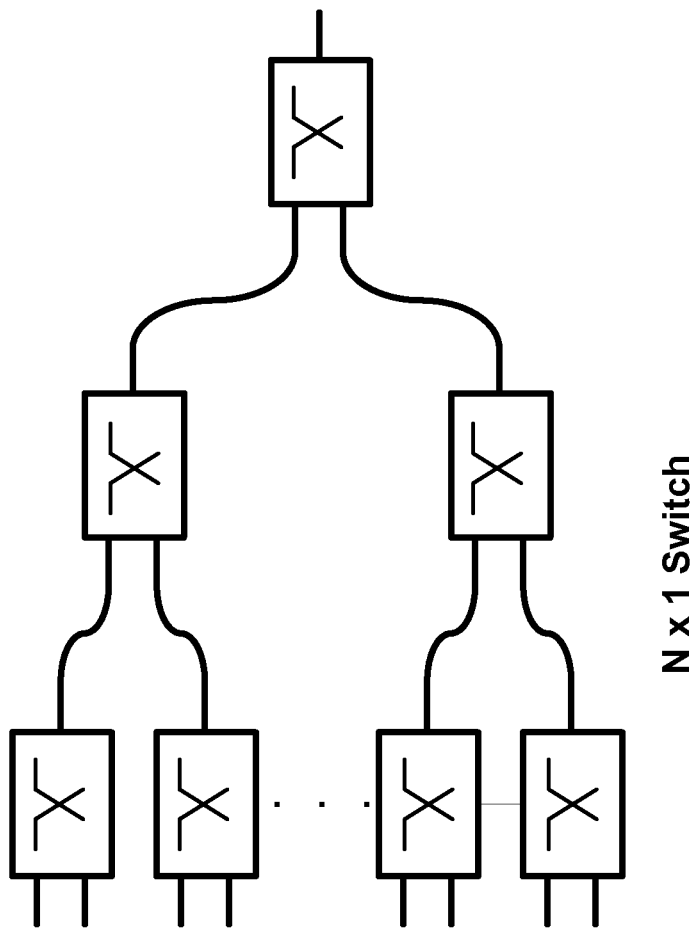
FIG. 3 depicts a schematic of an N×1 endless switch according to an aspect of the present disclosure.

As may be observed from FIG. 4, for each of the N modes demultiplexed, demultiplexer 400 includes an EPS-ES (endless-phase-shifter-endless-switch-structure) which in turn has N−1 endless phase shifters (i.e., $EPS_{1-1}$) and N−1 endless 2×1 switches (i.e., a tree structure such as that shown in FIG. 3 within $ES_1$). As a result of this configuration, there are 2(N−1) analog controls and 2(N−1) digital controls for each mode. Notably, there are 2N(N−1) analog controls total as digital controls may be used for resets. Consequently, this represents the minimum number of analog controls required for the demultiplexer 400.

To understand this minimal number, we note that the fiber has "multiplied" the initial N complex signals by a slowly varying N×N matrix of complex numbers. For a general, non-unitary case, all elements of the matrix are independent. As may be appreciated, the demultiplexer must invert this matrix, and therefore requires $2N^2$ real-valued controls. Since the amount of attenuation and amount of phase shift that a demultiplexed signal has undergone is not of concern, we can advantageously eliminate 2N controls. Consequently, the total number of required controls is $2N^2-2N$—which is equal to the number noted above.

As may be understood and appreciated by those skilled in the art, each of the elements may be controlled via a preferred valley search algorithm whereby each analog control for a mode is adjusted in turn to minimize a measured quantity. Advantageously, for quadrature phase-shift keying (QPSK) environments, interference RF power may be minimized after demultiplexing—but before demodulation.

As may now be appreciated, a PDM demultiplexer is an example of a 2×2 MIMO demultiplexer. With simultaneous reference to FIG. 5 and FIG. 6, there is shown exemplary, endless PDM demultiplexers that may be fabricated with integrated optics. As is known, a polarization beam splitter (PBS) and a polarization rotator (PR) convert the two orthogonally polarized modes of light received from the fiber into two co-polarized, spatially separated modes. A network of phase shifters and couplers unscrambles the original two signals from these two modes.

An optical PDM demultiplexer may be thought of as an endless polarization controller operated in reverse. Endless polarization controllers have been demonstrated in $LiNbO_3$, silica, and silicon. The $LiNbO_3$ controller takes advantage of the electro-optic effect of $LiNbO_3$ to create a birefringence axis that is rotatable to any angle. Such a $LiNbO_3$ controller can in principle achieve endless demultiplexing using the minimum number of analog controls for the non-unitary case, four. However, in practice, multiple elements are used in series, because of the small phase shifting range of each element, and thus the number of analog controls is significantly larger.

Figure 5:
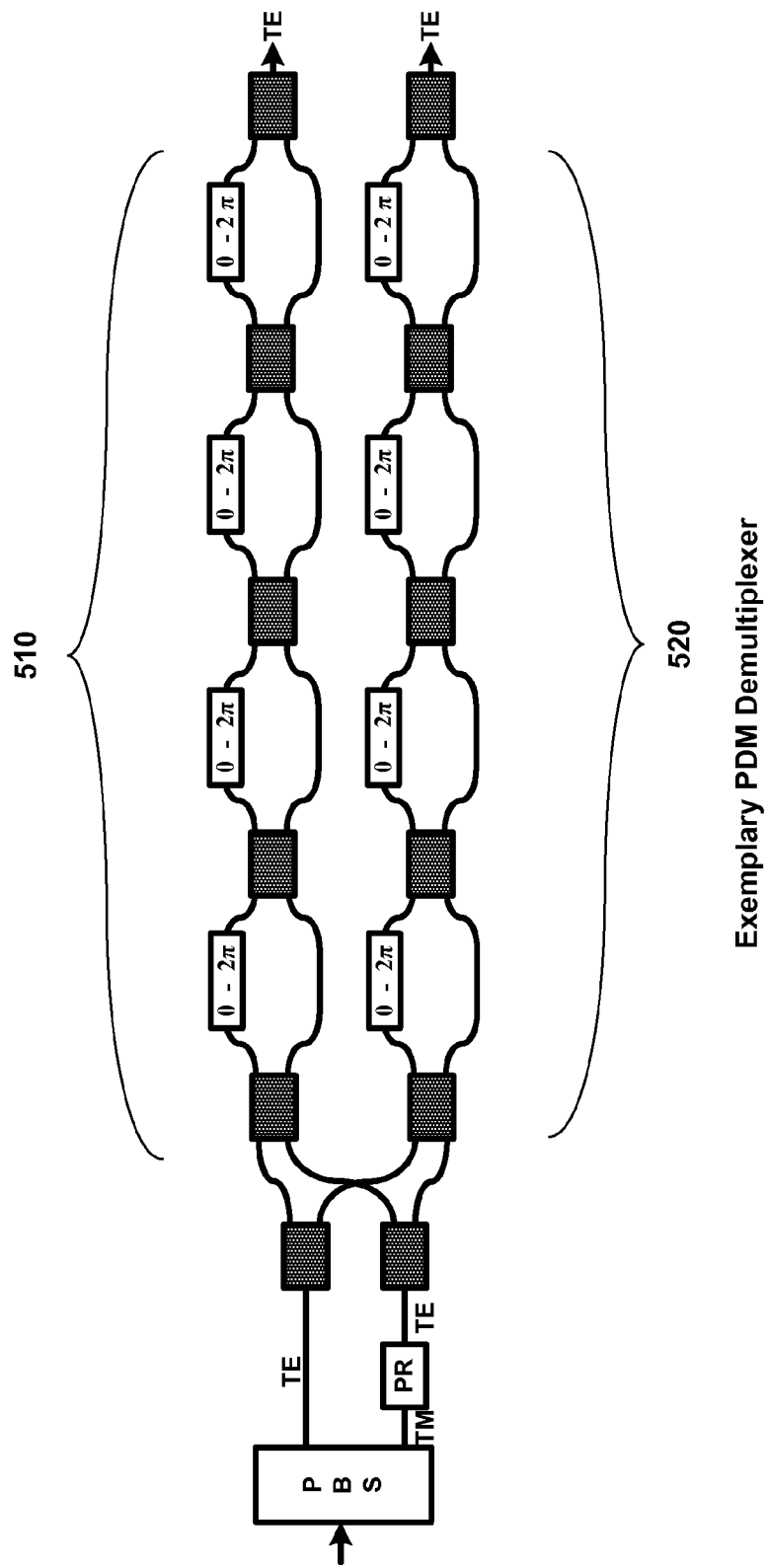
FIG. 5 depicts a schematic of an example PDM demultiplexer.

Known silica and silicon polarization controllers typically employ a cascade of MZIs, such as those shown in FIG. 5. As shown in that FIG. 5 a number of cascaded MZI structures 210, 220—each including a phase shifter of limited range (i.e. 0-2π) are used to construct such exemplary structures. Optical signals received are split through the effect of a beam splitter (PBS), one of the resulting split signals is rotated through the effect of a rotator (PR), and the pair of split signals directed to the cascaded MZI structures 210, 220.

Yet while such PDM demultiplexers are effective, they typically employ eight analog controls—which is twice the minimum number. Such a large number of analog controls is required for redundancy in order to achieve endless operation. More particularly, when a phase shifter reaches a limit, it unwinds slowly back to the center of its operating range while the other three phase shifters continue control. Situations can arise where multiple phase shifters must unwind simultaneously, greatly complicating the control. Further compounding deficiencies associated with such designs is the difficulty with expanding these 2×2 designs to higher order MIMO systems.

Figure 6:
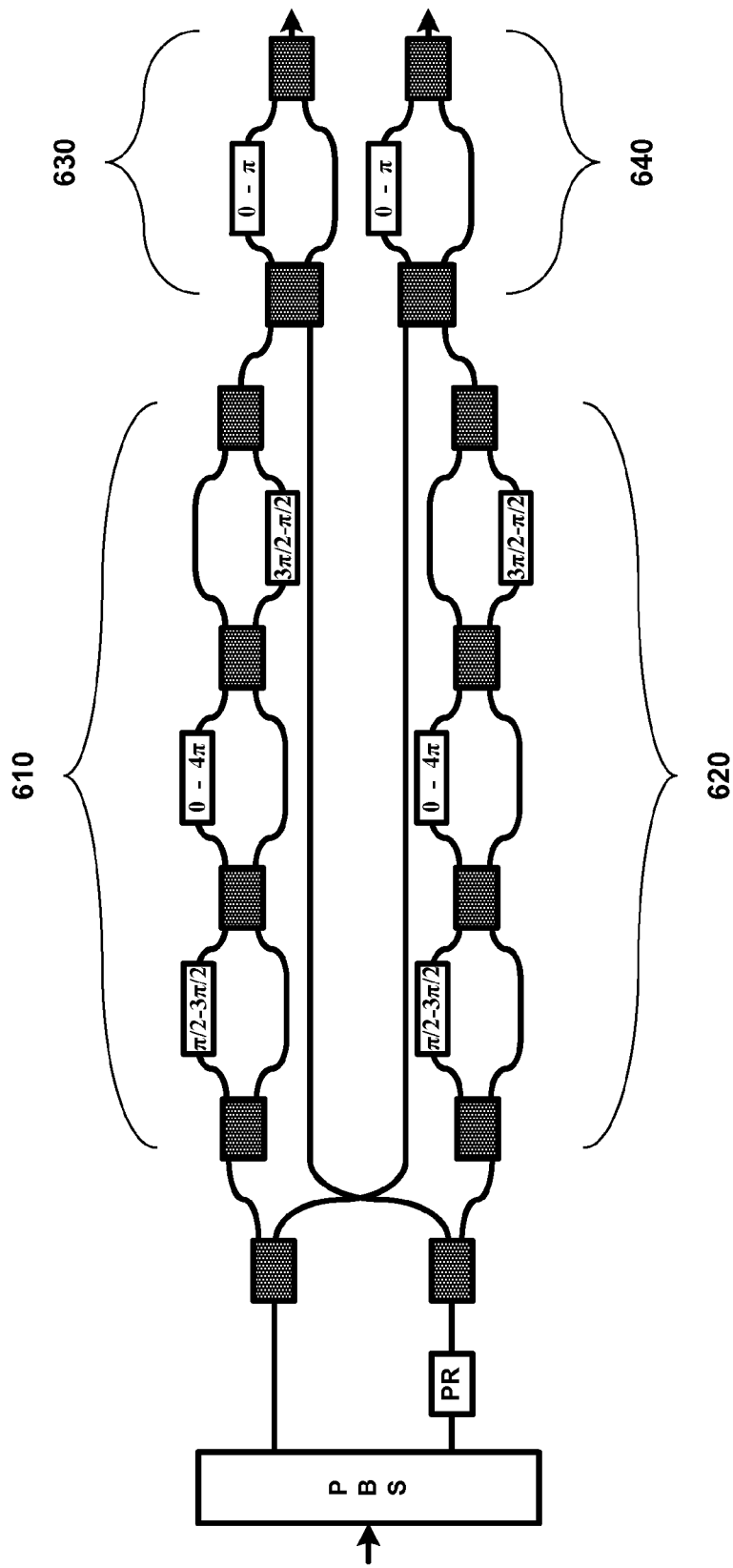
FIG. 6 depicts a schematic of an exemplary PDM demultiplexer according to an aspect of the present disclosure.

FIG. 6 shows a schematic of a PDM demultiplexer according to the present disclosure. As shown, a pair of endless phase shifters 610, 620 receive as input optical signals that are split through the effect of a splitter (PBS). One of the split signals is rotated by rotator (PR) and then directed into the endless phase shifter, while the other one of the split signals are directed directly into the other endless phase shifter. Advantageously, the configuration shown in FIG. 6 requires only four analog controls, speeding up the control by a factor of two. Furthermore, there is no slow unwinding required with this configuration—just rapid resetting. No pathological cases have to be handled. Finally, there is no concern about multiple endless phase shifters having to reset simultaneously, as in the prior art.

Figure 7:
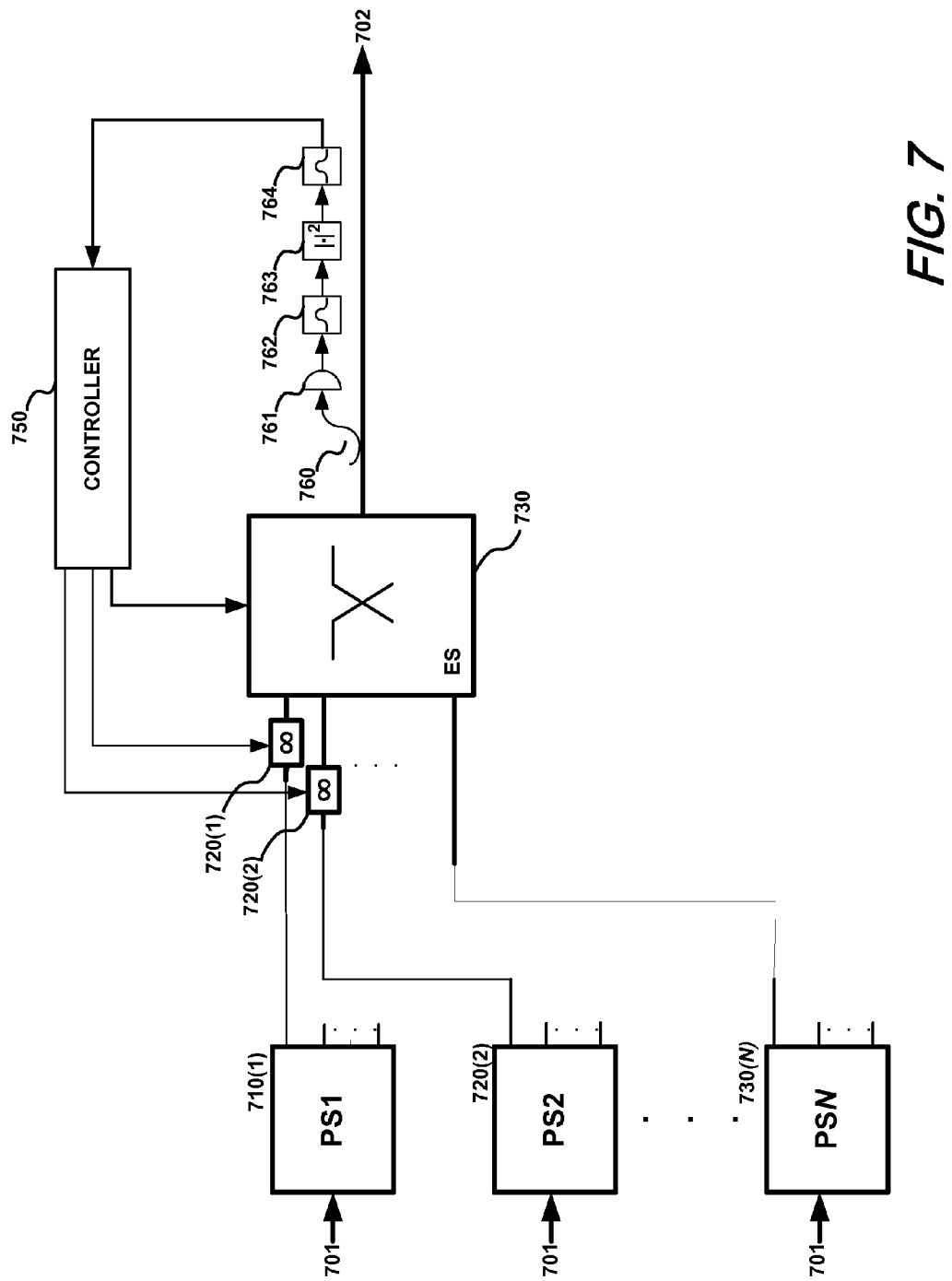
FIG. 7 depicts a schematic of an exemplary control system integrated with the PDM demultiplexer of FIG. 6 according to an aspect of the present disclosure.

FIG. 7 depicts a schematic of an exemplary control system integrated with the PDM demultiplexer of FIG. 6 according to an aspect of the present disclosure. As such, it only shows a single one of the endless phase shifter—endless switch structures shown in previous drawings.

More particularly, a number of input signals 701 exhibiting N modes are simultaneously applied to N power splitters 710(1) . . . 710(N) which split the applied signals into N output signals. As exemplary shown in the FIG. 7, each of the signals output from the first N−1 power splitters is directed to endless phase shifter, i.e., 720(1), 720(2), . . . 720(N−1), and in turn to the endless switch 730, while the output from the Nth power splitter 720(N) is directed directly to the endless switch 730. Therein the signals are processed and an overall output signal exhibiting a single mode is output 702. As may be understood and as shown previously, when these structural arrangements are repeated N output signals each exhibiting a different mode may result.

Shown further in FIG. 7 are exemplary control elements which may be used to drive the endless phase shifters (720(1), 720(2), . . . 720(N−1)) and the endless switch(es) 730. In particular, signals output from the endless switch 730 may be sampled through the effect of tap 760, detected via photodetectors 761, filtered 762, rectified 763, and filtered 764 to serve as input to controller 750. Controller outputs drive endless phase shifters 720(1), 720(2), . . . 720(N−1) and endless switch 730. Notably, while the arrangement shown in FIG. 7 shows a single controller with a single endless phase shifter—endless switch structure, those skilled in the art will appreciate that a single controller may be used to control a number of such structures as appropriate r desired.

A simulation was performed of a PDM-differential quadrature phase-shift keying (DQPSK) system to test the controller configuration of FIG. 6. As may be appreciated, a PDM-DQPSK system using optical demodulation according to the present disclosure exhibits substantially the same spectral efficiency as a coherent PDM-QPSK system and does not require a local oscillator, linear photodiodes, an analog-to-digital converter, or a DSP. Its drawbacks are a ~2.1-dB sensitivity penalty (when the coherent system is using differential encoding) and difficulty in compensating dispersion.

In the simulation a PDM-QPSK signal is launched with a pseudo-random bit sequence (PRBS) length of $2^9-1$. One quadrature is shifted by 22 bits with respect to the other, and the two PDM streams are shifted by exactly one symbol with respect to each other (a non-integer symbol shift was tried and achieved the same performance within 5% of the eye opening). The PDM signal passes through seven rotation matrixes, the angle of each matrix rotating at a different speed. Each rotation matrix includes 0.9-dB polarization-dependent loss.

The rotation amount θ of the signal is measured on the Poincare sphere for each iteration by using the following formula:

$$\theta = 2\cos^{-1}(<a|b>/\sqrt{<a|a><b|b>})$$

where a is one state, and b is the next state.

Operationally, a scrambled PDM signal passes through an apparatus such as that depicted in FIG. 6 (610, 620) and then through two Mach-Zehnder delay interferometers for DQPSK demodulation (630, 640), wherein the eye opening is recorded for one quadrature of one polarization. In the absence of PDM, the eye opening is 0.95.

Before the demodulation, the signal RF spectrum is measured and the total power at half the symbol rate, with a resolution bandwidth of 0.3 times the symbol rate, is measured. The control works as follows: the RF interference power is noted. Then the line phase shifter for that output is incremented by 1.7 degrees. The new RF interference power is noted. Then the line phase shifter is decremented by 3.4 degrees, and again the RF interference power is noted. Using these three datapoints, a curve fit is done, and the line phase is adjusted to the new minimum RF interference power point. This procedure does likewise with the switch phase shifter for that output. If the line phase shifter reaches 0 or 4π it is switched out, reset to 2π, and switched back in. Then the loop repeats.

Figure 8:
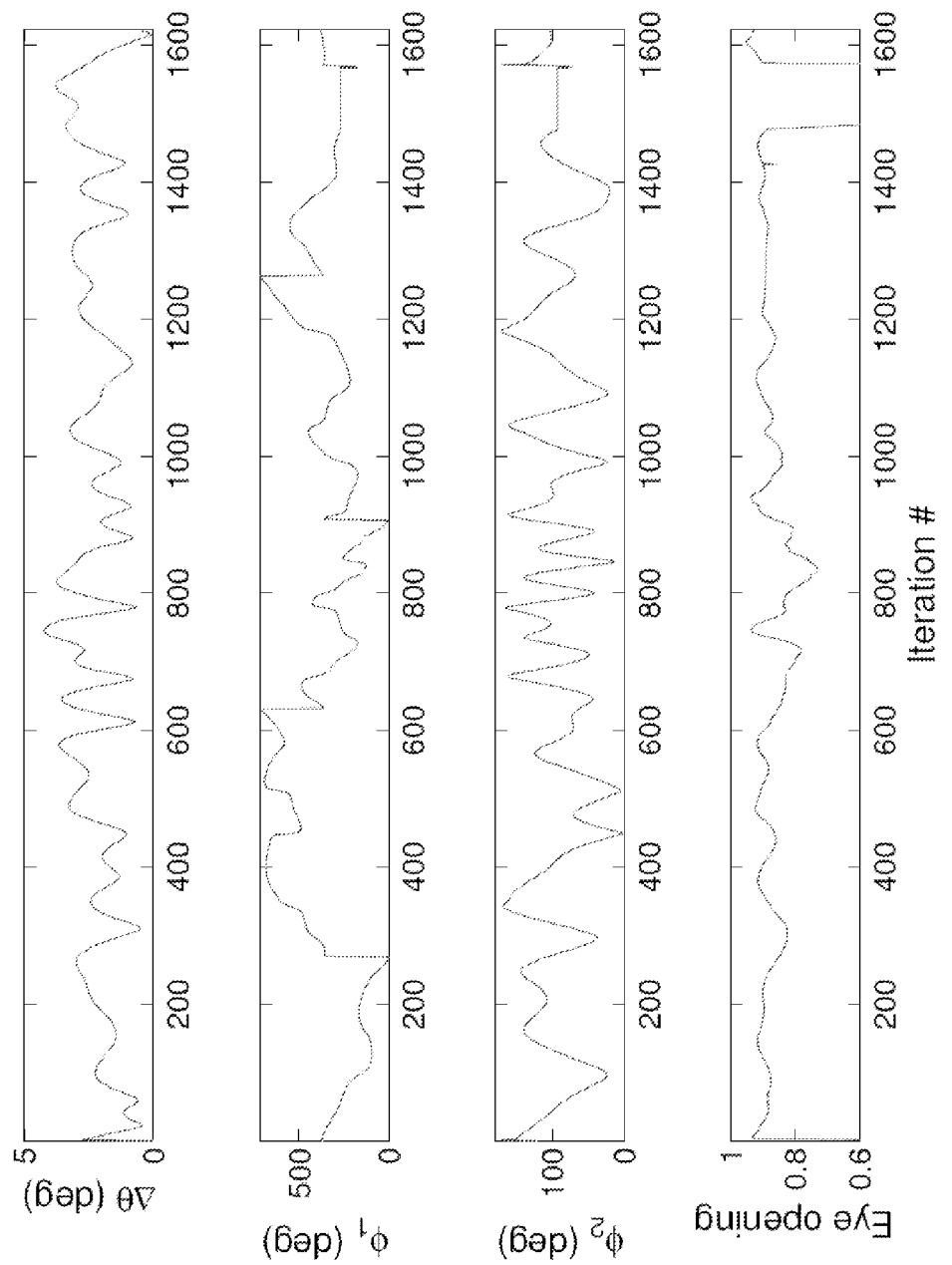
FIG. 8 depicts simulation results of a PDM controller according to the present disclosure for one demultiplexed polarization where $\Delta\theta$ is the movement on the Poincare sphere, $\phi_1$ is the phase of the line phase shifter, and $\phi_2$ is the phase of the MZI.

FIG. 8 shows the simulation results. The tracking locks on in just a few iterations. There are four reset events in the line phase shifter phase, $\Delta\phi_1$. These resets momentarily pause the control but do not cause disruption. At about iteration #1480 the tracking was turned off for about 100 iterations, showing that the eye closed in just a few iterations.

The scrambling in the simulation was adjusted to be as fast as possible without losing the tracking. This maximum is about 5 degrees of rotation on the Poincare sphere per iteration.

In each iteration, there are six sequential phase-shifter adjustments. The fastest reported polarization evolution in fiber is 550 krad/s by hitting a fiber spool with a metal ball. However, most links are unlikely to experience such fast rotation, and system experiments of 1035 km in length have shown good performance with rotation speeds of 0.8 krad/s. If we assume we need 10 krad/s of system movement on the sphere, we will need an analog phase-shifter response time of 1.5 μs. This should be possible using thermooptic phase shifters in silicon wire waveguides. We assume the digital switches are significantly faster.

Similarly, a simulation of a four-mode DQPSK system was performed. An example of such a four-mode DPQSK system may be—for example—a two-core fiber with inter-core coupling, each core carrying two polarizations.

As with the two-mode DQPSK simulation, we start with a DQPSK signal generated by a $2^9-1$ PRBS pattern and create four streams, each shifted by three successive symbols. We pass these through six scrambling stages, each stage comprising a star coupler and phase shifts that rotate at different speeds in each arm and for each stage. We apply 0.1-0.4 dB of mode-dependent loss at each stage.

We note the rotation on the 7-dimensional sphere by using the same orthogonality equation as before. We pass the signal through the structure of FIG. 2, for N=4. We calculate the RF interference power of one of the demultiplexed modes and then demodulate it in an MZDI and record the eye opening of one of the quadratures. For each control iteration, each of the three line phase shifters are adjusted up and then down by 0.4 degrees, and the phase-shift value is chosen that minimizes the RF interference power. It is likewise with the three switches, which are in a tree arrangement.

Figure 9:
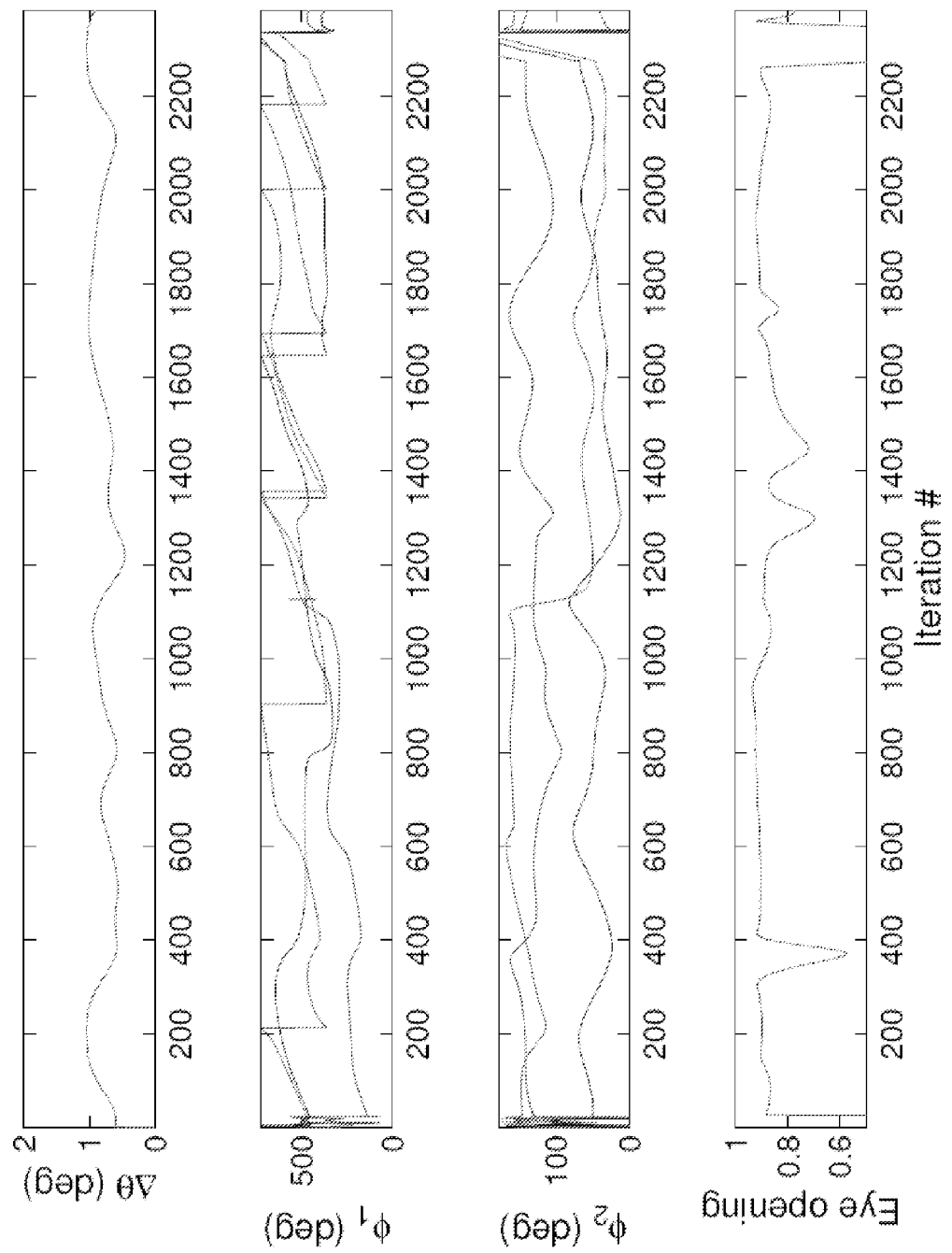
FIG. 9 depicts simulation results of a four-mode controller according to the present disclosure for one demultiplexed mode where $\Delta\theta$ is the movement on the Poincare sphere, $\phi_1$ are the phases of the three line phase shifters, and $\phi_2$ are the phases of the three MZIs.

FIG. 9 shows the simulation results. The system takes considerably longer to lock on than the 2x2 system. At about iteration #2300 the tracking was momentarily turned off. In each iteration there are 18 sequential phase-shifter adjustments. The maximum tolerable angle change is about 1 degree per iteration. Thus, assuming 10 krad/s of system movement, we will need a phase-shifter response time of 0.1 μs. This will likely require electro-optic phase shifters.

At this point, while we have discussed and described the disclosure using some specific examples, those skilled in the art will recognize that our teachings are not so limited. In particular, while the present disclosure has described MIMO optical demultiplexing, the disclosure is not so limited. More particularly, optical applications requiring phase shifting, and/or switching are within the scope of the present disclosure. Accordingly, the invention should be only limited by the scope of the claims attached hereto.

The invention claimed is:

1. An optical apparatus comprising:
   a first Mach-Zehnder interferometer (MZI) switch including a phase shifter;
   a second MZI switch including a phase shifter; and
   a line phase shifter structure optically connecting the first MZI to the second MZI, said line phase shifter structure including two waveguides, at least one of the waveguides having a phase shifter;
   wherein the phase shifter included in the first MZI switch and the phase shifter included in the second MZI switch are configured to substantially simultaneously switch from $\pi/2$ to $3\pi/2$ and $3\pi/2$ to $\pi/2$ respectively, in response to a value of substantially 0 or $4\pi$ exhibited by the line phase shifter.

2. The optical apparatus of claim 1 wherein the two waveguides in the line phase shifter structure have a path-length difference less than 10 microns.

3. The optical apparatus of claim 1 wherein the line phase shifter structure is optically connected to the first MZI switch and the second MZI switch by a first and second 2x2 optical coupler, respectively.

4. The optical apparatus of claim 1 wherein the overall phase of the optical apparatus is preserved after the substantially simultaneous switch.

5. The optical apparatus of claim 1 further comprising a controller connected to at least one of the phase shifters.

6. The optical apparatus of claim 5 wherein the controller is connected to an output signal of the apparatus.

7. The optical apparatus of claim 1 operable to reset the phase shifter in one of the waveguides when there is no light in that waveguide.

8. The optical apparatus of claim 5 operable to monotonically increase an optical phase of an optical signal by an amount of more than 1000 radians.

9. The optical apparatus of claim 1 further comprising a controller connected to the phase shifters in the first MZI, the second MZI, and the line phase shifter structure, for controlling the phase(s) of the respective phase shifters.

10. The optical apparatus of claim 9 operable to monotonically increase an optical phase of an optical signal by an amount of more than 1000 radians.

* * * * *